United States Patent [19]

Lardiere, Jr. et al.

[11] Patent Number: 4,982,121
[45] Date of Patent: Jan. 1, 1991

[54] EXPULSIVE SEPARATION APPARATUS

[75] Inventors: Benjamin G. Lardiere, Jr., Milford; Joshua I. Goldberg, Woodbridge, both of Conn.

[73] Assignee: Dataproducts New England, Inc., Wallingford, Conn.

[21] Appl. No.: 421,053

[22] Filed: Oct. 13, 1989

Related U.S. Application Data

[63] Continuation-in-part of Ser. No. 205,637, Jun. 13, 1989, Pat. No. 4,894,569.

[51] Int. Cl.$^5$ .................... H02K 3/04; B05D 3/06; B64D 13/00
[52] U.S. Cl. .................... 310/10; 244/134 R; 318/116
[58] Field of Search .............. 174/40 R, 40 TD, 70; 307/147; 310/10, 15; 340/580, 582; 361/143; 343/704; 244/134 R, 134 D

[56] References Cited

U.S. PATENT DOCUMENTS

| | | | |
|---|---|---|---|
| 3,549,964 | 12/1970 | Levin | 244/134 R |
| 4,629,149 | 12/1986 | Carson et al. | 244/134 R |
| 4,678,144 | 7/1987 | Goehner et al. | 244/134 D |
| 4,875,644 | 10/1989 | Adams et al. | 244/134 R |
| 4,894,569 | 1/1990 | Lardiere, Jr. et al. | 310/10 |

FOREIGN PATENT DOCUMENTS

| | | | |
|---|---|---|---|
| 1216956 | 5/1966 | Fed. Rep. of Germany | 174/70 R |
| 54-15190 | 2/1979 | Japan | 174/40 R |
| 615560 | 6/1978 | U.S.S.R. | 307/147 |

*Primary Examiner*—Steven L. Stephan
*Assistant Examiner*—D. L. Rebsch
*Attorney, Agent, or Firm*—Bachman & LaPointe

[57] ABSTRACT

An electro-expulsive apparatus including at least two superposed, flexible flat, separately jacketed continuous ribbons of metallic electrical conductor disposed within a sealed outer jacket so that portions of said separately jacketed electrical conductors are separable within said outer jacket to create a void when said conductors are energized simultaneously by an electrical current. The disclosure also includes restoring means for returning the separated conductors to rest position and a method of expulsing solid or frangible material.

12 Claims, 4 Drawing Sheets

EXPULSIVE SEPARATION APPARATUS

RELATED APPLICATION

This application is a continuation-in-part of co-pending U.S. application, Ser. No. 205,637 filed June 13, 1989 by Lardiere et al entitled AN ELECTRO-EXPULSIVE SEPARATION APPARATUS, now U.S. Pat. No. 4,894,569.

FIELD OF THE INVENTION

The present invention relates to electro-expulsive separation devices and processes and relates, in particular, to such devices and processes which are operable in virtually explosive fashion to shatter and remove solid or frangible matter.

BACKGROUND OF THE INVENTION

The above co-pending '637 application is incorporated herein by this reference.

A representative prior art device is shown and described in U.S. Pat. No. 4,690,353 entitled ELECTRO-EXPULSIVE SEPARATION SYSTEM, issued Sept. 1, 1987 to Haslim et al.

In this unit the electrical conductor is formed from a blank of suitable metal creating a pattern of continuous ribbons in zig-zag fashion with intervening gaps.

The pattern is then folded about an axis 36 to define two sections 37 and 38 as is most apparent in FIG. 3 of the '353 patent; the folding step creates a plurality of ribbon hinges.

While the device of the '353 patent is operative it has a significant disadvantage; i.e., the occurrence of stress cracking, metal fatigue and conductor failure at any one of the numerous hinges arrayed along the axis 36.

In operation, the unit is subject to periodic flexing placing stress on the various hinges; failure of one hinge results in failure of the complete device.

SUMMARY OF THE INVENTION

Consequently, it is a particular feature of the present invention to provide an electro-expulsive apparatus and process for shedding (separating) solid or frangible matter such as ice from the apparatus at low voltage while achieving long operational life.

A further feature of the invention is the provision of an expulsive device in the form of an elongated, flexible thin package suitable for attachment to a surface such as an aircraft wing wherein a blanket of elastomeric material encloses metallic electrical conductor means.

The conductor means and the blanket walls are separable in accordance with a predetermined pattern under control of spaced connector means joining the blanket walls with an intermediate layer in response to repelling forces created by a magnetic field developed when said conductor means are energized by an electric current.

Long operating life is achieved by taking advantage of a little known property of elastomeric materials (such as polyurethane, polyethylene and butadiene) from which the blanket and the intermediate layer are fabricated.

The beneficial property is that initially (during the first 80 micro-seconds of an applied force) the effective modulus of compression (Young's Modulus) of such elastomeric materials is much greater than the modulus values assigned in the usual and customary specifications contained in standard chemical handbooks and chemical dictionaries. That is, initially, the materials are virtually solid.

The invention takes advantage of this property by applying a very high current to the conductors of the blanket for a very short time and thereby forcing the surface of the blanket to move almost exactly the same distance as the internal conductor has moved. The initial high modulus of the elastomer makes it almost incompressible in the short term, giving the blanket surface a gain motion in a ratio of nearly 1 to 1 relative to the corresponding surface motion of the underlying conductor. The extremely high force, with minimal motion, fractures the crystalline ice (or other frangible material) at the blanket surface and destroys the bond between the ice and the blanket. Wind velocity or gravity then cause the ice to be shed.

The very short pulse contributes to blanket life by limiting the motion required to successfully de-ice. In the earliest portions of the expulsive pulse little metal (copper) or elastomer deformation takes place. Since fatigue damage to both materials is strongly related to total material deformation, the shortened pulse is not only efficient of energy, but provides extended life for all blanket geometries by reducing fatigue damage per cycle.

A further improvement to expulsive separation systems which include the blankets described, are the means used to achieve short pulses. In most cases, a pulse consists of charging a capacitor to a chosen voltage, switching on a silicon controlled rectifier (SCR) and discharging that capacitor into the blanket.

This invention uses an improvement to the traditional means. Initially, a capacitive discharge is used. As the pulse current flows, a second capacitor which has been previously charged to a voltage which is referenced to the first capacitor, is connected through a second SCR to the cathode of the first SCR. This causes reverse current and voltage to be applied to the first SCR, shutting it off almost immediately. The second capacitor is much smaller than the first capacitor. This means the total energy delivered to the blanket is significantly less than the total energy of the first capacitor. By this means as much as 80% of the energy stored on the first capacitor may be retained. This further reduces the power consumption of the overall expulsive separation system.

Another objective of this invention is to provide a long, narrow, thin (0.030" to 0.080" thick) blanket geometry wherein all electrical connections between electronics and blanket are made at one end. This improvement drastically reduces the weight of the leads required to connect blankets to electronics. Blankets are made in long, narrow strips for convenience. To cover a particular surface, multiple segments are laid out side by side with their long dimensions abutting. After these segments have been affixed to the surface to be protected, a thin covering or coating layer of adhesive tape such as polyethylene, a conformal layer of metallic foil or a spray coating of filler material is applied over all the segments to provide a smooth continuous outer surface. All segment connections are at the narrow end. The driver electronics are placed so as to be closest to the connection end. In the case of prior art multiple rectangular segments, harness connection must be made at increasingly large distances as segments get further from the electronics which fires them. In the layout of the present invention, the harness length is minimized which in turn minimizes weight.

It is the further aim of this invention to provide low ice shedding threshold voltage while at the same time delivering long operational blanket life. This is achieved by controlling the local spring rate throughout the active region of a blanket segment. Inherently the spring rate varies in the space between blanket wall connector means so that blanket deformation varies; correspondingly, the metallic conductor deformation varies. The result of locally controlled spring rates is to provide non-uniform dynamic conductor deformation and therefore non-uniform blanket deformation during the time when the blanket is fired. This leads to long life of the total apparatus.

When the blanket is fired and the upper and lower conductors are repelled from each other, their motion is resisted by two major restoring forces. Since the unbonded voids (between blanket wall connector means) trap no air, static pressure resists conductor separation. Additionally, the elastomeric material which connects upper and lower blanket walls (connector means) stretches and acts as a spring to provide a restoring force.

In particular, it is desirable to provide a non-linear spring gradient between top and bottom (outer) walls of the blanket. Initially, the gradient should be nearly zero, so that all energy is converted into momentum of the outer (top) conductor and its mating wall. As the outer conductor separates from the inner conductor, the repulsive force diminishes because of the increased distance and because the current decreases as the discharging capacitor voltage decreases. When this occurs, increased spring gradient helps to restore the blanket to its rest condition.

As stated earlier, in order to achieve a long blanket fatigue life it is necessary to provide minimal stress throughout the conductor of the outer layer. By providing a periodically varying spring gradient in the longitudinal axis of the conductor runs, the required stress distribution is achieved. The periodic variation creates a mild serpentine or sinusoidal deformation in the longitudinal dimension of outer conductor. This is desirable for two reasons. First, the long, narrow serpentine configuration of the conductor prevents lateral bowing and subsequent fatigue (If lateral bowing occurs, then excess stress will occur at the side edges of each longitudinal conductor run). Second, the ripple effect on the surface of the blanket aids in breaking the ice-blanket bond.

A preferred means of achieving this type behavior is by bonding the top (outer) wall of the blanket to the bottom (outer) wall of the blanket using an intermediate layer of elastomeric material disposed between the top and bottom walls. This intermediate layer is bonded to top and bottom walls through offset perforations or holes in two separating high melting thermo-electric insulators. By using an intermediate layer bonded alternately to the inner and outer walls, two important functions are achieved.

As the conductors separate, the intermediate layer is stretched because of its connection through said perforations to the top and bottom walls. This spring effect is not uniform (from perforation to perforation) in the forces it exerts on the conductors.

A first set of perforations in a first insulator permit a connection from the bottom wall to the intermediate layer. A second set of perforations in a second insulator, offset from said first set of perforations, permit a connection between the top wall and the intermediate layer.

When the top conductor begins to accelerate away from the bottom conductor the restoring force is greatest in the region of the intermediate layer connection. This periodically varying restoring force creates the required serpentine deformation of the outer conductor.

An apparatus enhancing certain features of the present invention may comprise a flexible blanket having first and second outer walls, at least two separable electrical conductor means enclosed within said blanket, said conductor means having a first position defining a rest position and a second position defining an energized position, an intermediate layer sandwiched between said conductor means, and, elastic connector means within said blanket for joining the first and second walls to said intermediate layer at spaced intervals whereby said conductor means are separable in accordance with a predetermined pattern under control of said connector means in response to repelling forces created by a magnetic field developed when said electrical conductor means are energized by an electric current.

A method of expulsing solid or frangible material bonded to a surface may comprise the steps of impacting the material abruptly with a force of sufficient magnitude to break the bond between the material and the surface, and, sustaining the force for an interval ranging from 10 to 80 microseconds.

Other features and advantages of the present invention will become more apparent from an examination of the succeeding specification when read in conjunction with the appended drawings, in which;

DETAILED DESCRIPTION OF THE INVENTION

Figure 1:
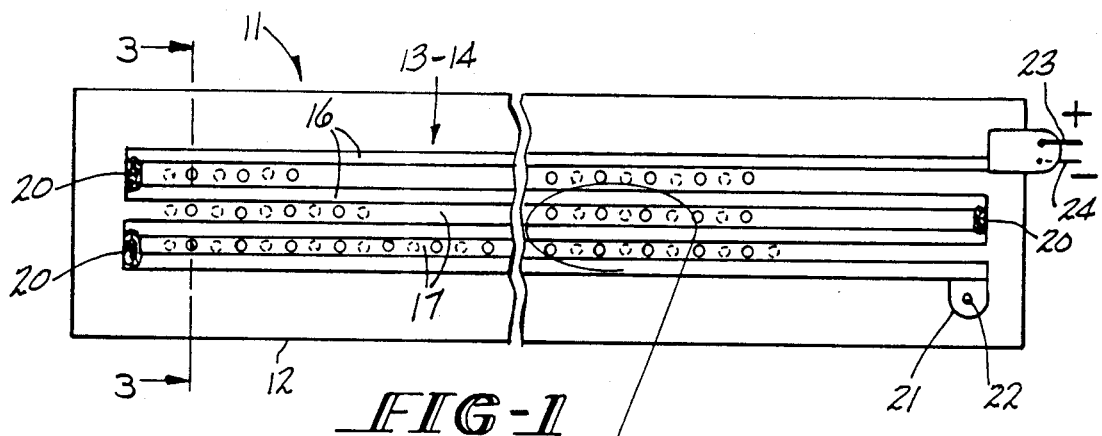
FIG. 1 is a plan view of a preferred embodiment of the improved expulsive blanket of the present invention.

Referring to FIGS. 1, 2, 3 and 4 the reference numeral 11 designates an expulsive separation apparatus comprising a blanket 12 of thermo plastic material such as polyurethane, polyethelyne and butadiene enclosing elongated continuous ribbon-like conductor means 13 and 14.

The conductor means 13 and 14 include ribbon portions 16 with intervening spaces 17, and top conductor means 13 is aligned generally with bottom conductor means 14.

Figure 4:
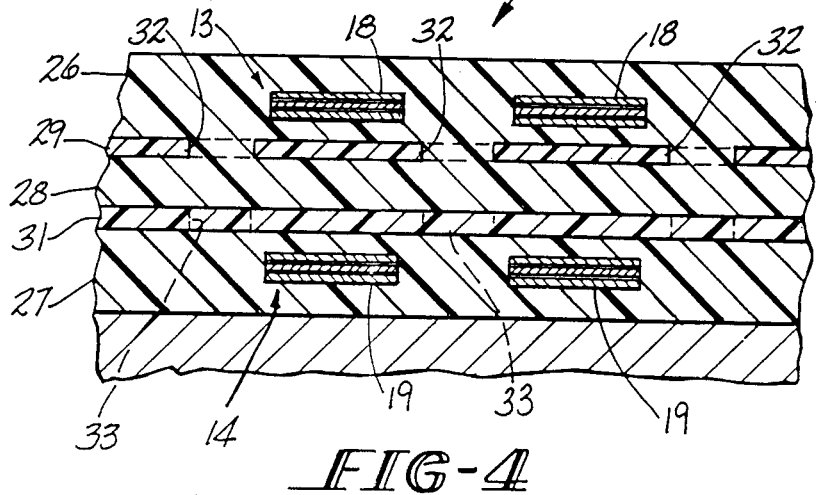
FIG. 4 is a view of a portion of FIG. 3 enlarged for clarity.

As is most apparent in FIG. 4 each conductor means 13 and 14 comprise stacks of flat metallic continuous ribbons indicated generally by the reference numerals 18 and 19 respectively.

The ribbons 18 and 19, in the disclosed embodiment, are three in number and range in thickness from 0.001 inches to 0.010 inches.

It is to be understood that although the ribbons of the present disclosure are fabricated of copper, it is anticipated that other suitable electrical conductors may be substituted. In addition, the ribbon stacks 18 and 19 may comprise single or multiple layers.

Each ribbon portion of each stack are joined as at 20 (Figure I) and includes a tab portion such as at 21, facilitating a spot electrical connector 22 providing electrical continuity between top conductor means 13 and bottom conductor means 14.

Top conductor means 13 is connected to positive lead 23 and bottom conductor means 14 terminates at negative lead 24.

Figure 5:
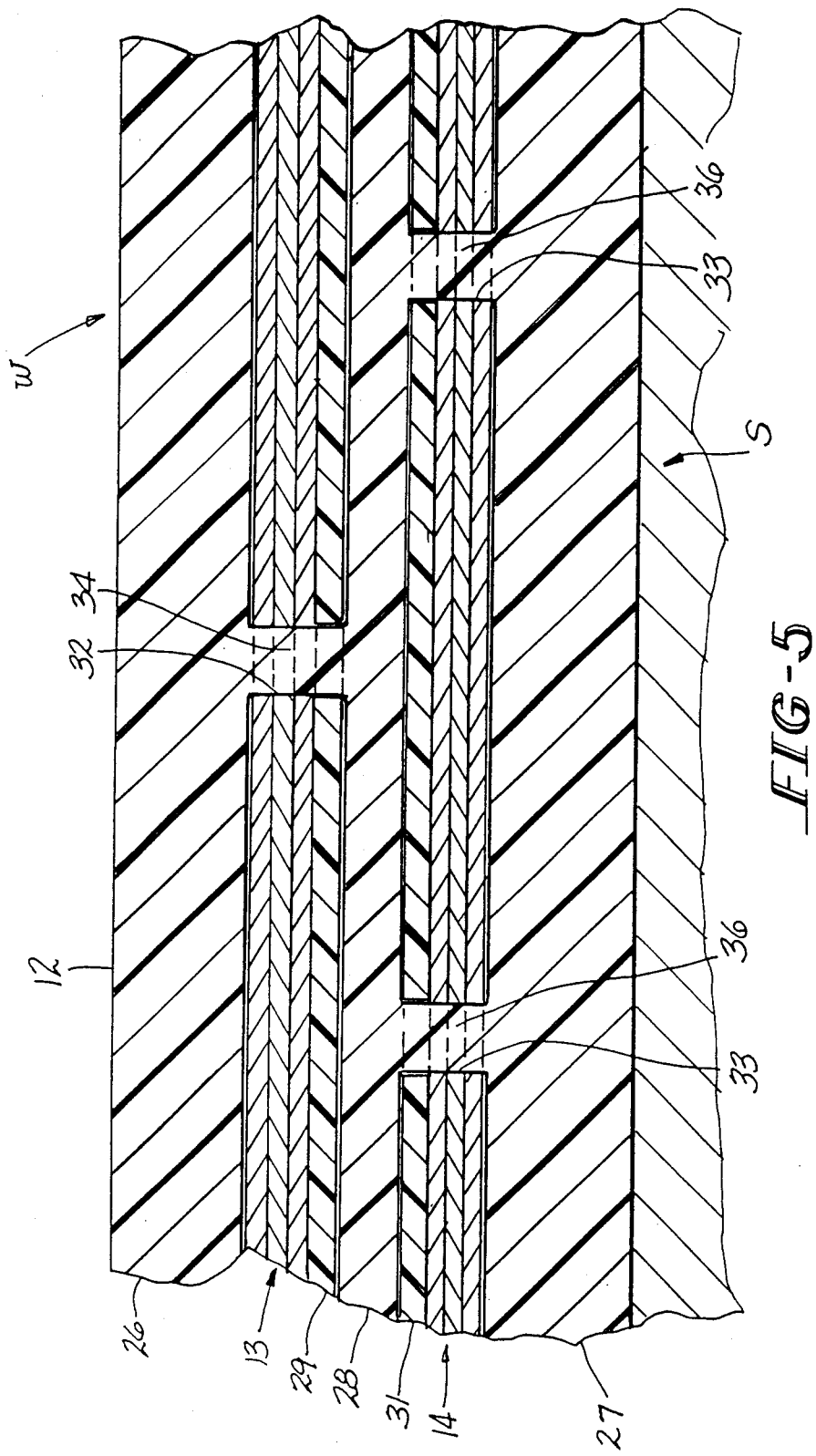
FIG. 5 is a vertical section of a portion of FIG. 2 in the plane of the line 5—5, enlarged, showing the blanket in a rest position.
Figure 6:
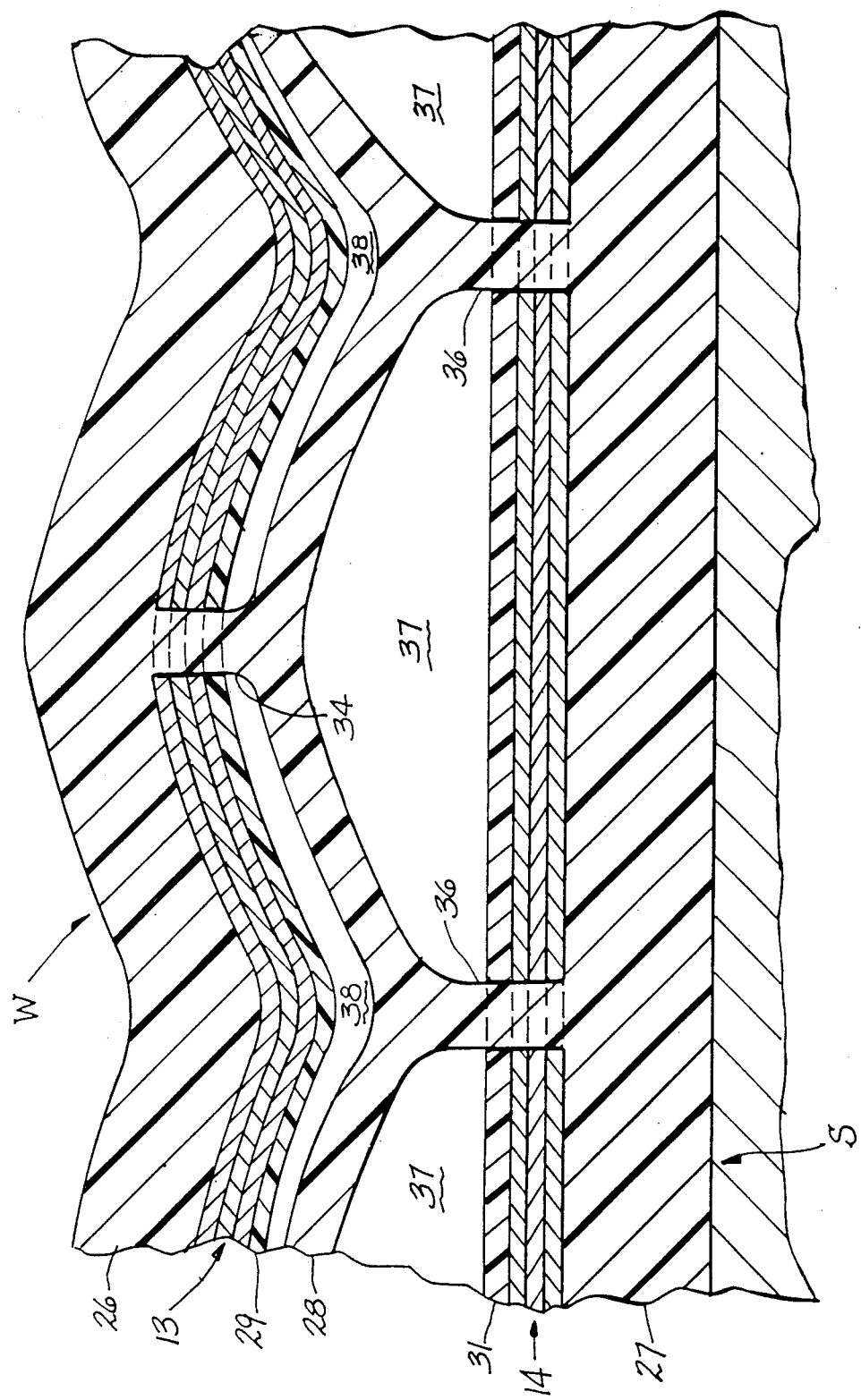
FIG. 6 is a view similar to FIG. 5 showing the blanket in the energized position.

As is most apparent in FIGS. 4, 5 and 6, the polyurethane of blanket 12 surrounds the conductor means 13 and 14 so as to define a first outer wall 26, a second outer wall 27 and an intermediate layer 28.

The main body of the conductor means 13 and 14 are isolated further by insulation means defining two layers 29 and 31 of high melting thermoplastic material such as TEFLON (tetrafluoroethylene).

It is preferred that the blanket 12 be fabricated of thermoplastic material of low melting point relative to the melting point of the insulator means.

The insulating layers 29 and 31, generally coextensive with the area occupied by the conductor means 13 and 14, are formed with perforations.

Insulating layer 29 is formed with perforation 32 and insulating layer 31 is formed with perforation 33.

Figure 2:
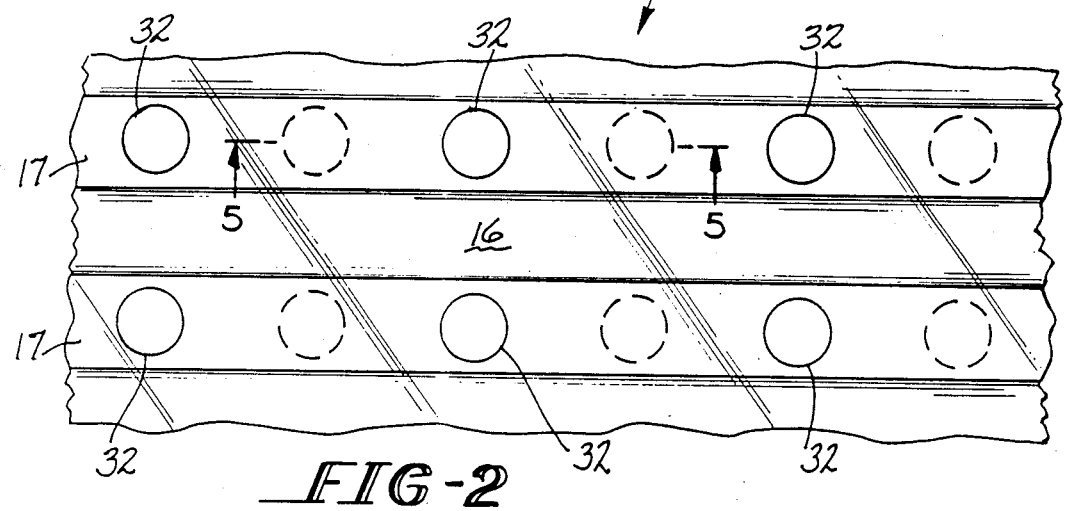
FIG. 2 is a plan view, enlarged, of a portion of the blanket of FIG. 1 showing distribution of perforations in the electro-thermal insulation means.
Figure 3:
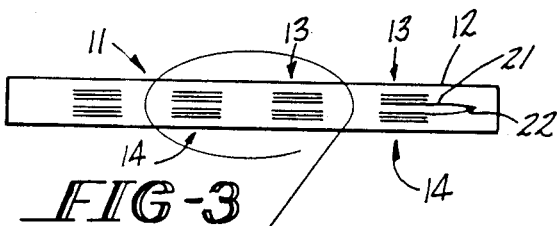
FIG. 3 is a vertical section of FIG. 1 in the plane of the line 3—3 and in the direction of the arrows showing distribution of conductor means.

The perforations 32 and 33 are offset from one another along the longitudinal axis of the blanket 12 and fall with the spaces or gaps 17 between ribbon stacks as shown in FIGS. 2 and 4.

This disposition of the perforations in insulating layers 29 and 31 makes it possible to provide connector means between the first outer wall 26 and the intermediate layer 28, and between the second outer wall 27 and the intermediate layer 28. The connector means is defined further by the pillars or posts 34 and 36, respectively.

This connection is accomplished by controlled heating and melting of the thermoplastic resin of the blanket 12 so that molten resin flows into the respective perforations 32 and 33 thereby joining the outer walls with the intermediate layer in the fashion described above.

The high melting electrical and thermal insulating layers 29 and 31 preclude welding between the outer walls and the intermediate layer except at the location of the perforations.

Thus, the first outer wall 26 is joined to the intermediate layer 28 by posts 34 and the second outer wall 27 is joined to the intermediate layer 28 by posts 36, as is apparent in the enlarged fragmentary sectional view of FIGS. 5 and 6.

In FIG. 5 a blanket segment is shown in the at rest position secured to a surface S, such as the wing of an aircraft, with the second outer wall 27 abutting the surface S and the first outer wall 26 exposed to weather W.

Periodically the conductor means are energized causing conductor means 13 and 14 to repel one another under control of the posts 34 and 36.

The inherent elasticity (elastic memory) in the thermoplastic material from which the posts are fabricated permits the posts to elongate and to provide a restoring force returning the blanket to the rest position of FIG. 5 when the conductor means are de-energized.

The restoring force is enhanced by the action of static pressure against the vacuum created in voids 37 and 38 when the blanket is energized.

Thus, when the conductor means 13 and 14 are energized, the outer conductor means 13 assumes a serpentine configuration (FIG. 6) causing accumulated solid or frangible matter such as ice to be shattered, breaking the bond between the ice and the outer wall 26, whereupon the ice disappears due to the force of gravity and the action of air currents sweeping over the wall 26.

It is anticipated that the blanket apparatus of the present invention can be fabricated of any desired length, with a variety of configurations of the conductor means, using any suitable conductive material, and blanket material so long as the thermal and electrical insulation means (29 and 31) operates to permit separation of the blanket walls in the fashion described and disclosed.

It is preferred that the thickness of the composite blanket be thin and blankets having a thickness ranging 0.030" to 0.080" inches operate in satisfactory fashion.

Figure 7:
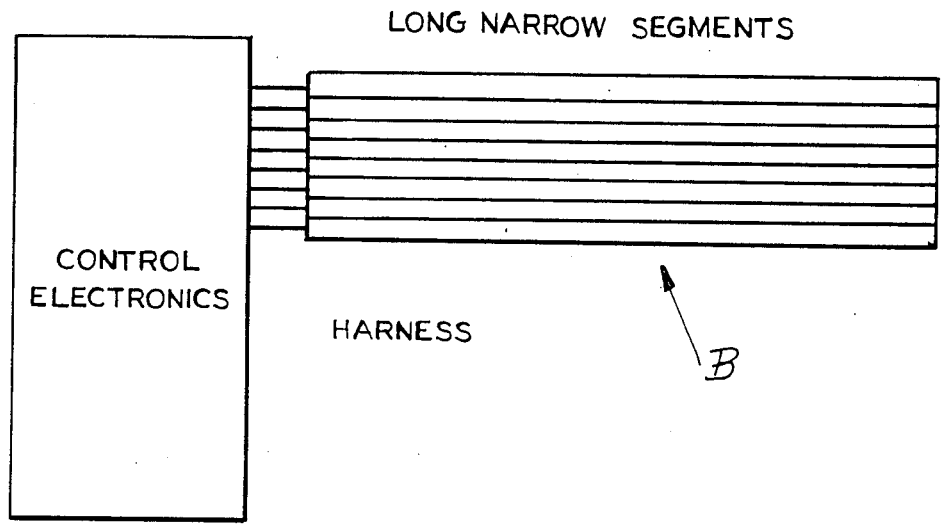
FIG. 7 is a schematic drawing showing the preferred arrangement of a plurality of blankets relative to the electrical harness and control box.

As indicated in FIG. 7, the long narrow configuration of blankets B minimizes electrical harness requirements and makes it possible to have a short span between the control unit and the blanket pattern.

Figure 8:
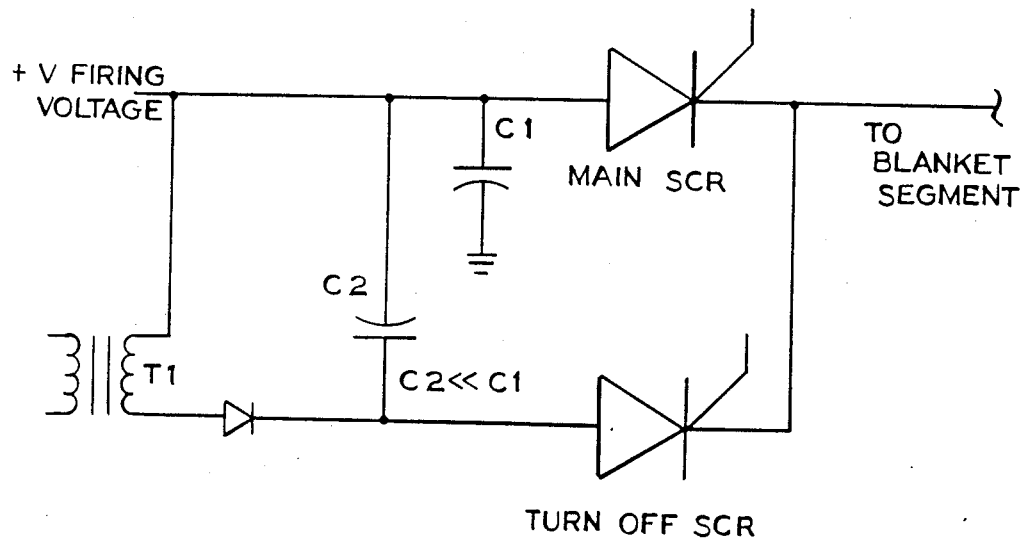
FIG. 8 is a diagram of typical circuitry for firing a blanket.

FIG. 8 is a schematic of typical circuitry for firing blankets.

Further advantages and various applications of the principles of the present expulsive blanket invention are the following:

1. Use multiple layers of expulsive blanket to transfer significant momentum to a solid object. This development would allow replacement of pyrotechnic squibs now used to fire under wing missiles.
2. Use of blankets as an integral part of liquid phase heat exchangers such as are used in "peak shaving" systems to minimize peak electrical loads in large air conditioning system. The systems in general, freeze water in off hours and melt it during peak hours. Blankets would keep the freezer coils ice free and allow more efficient operation.
3. Use the impulse nature of the output force to fracture coal along existing fault lines.
4. Use the impulse nature of the output force to create a shock wave in a pipe and thereby kill microbes that would otherwise require chemical treatment to destroy.
5. Use the impulse nature of the output force to create a pressure pulse in front of an non-symmetrical orifice so as to create net flow in one direction.
6. Use the impulse nature of the output force to create atomized liquids for use in a variety of coating processes.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. An electro-expulsive device comprising:

a flexible blanket having first and second outer walls,
at least two separable electrical conductor means enclosed within said blanket,
said conductor means having a first position defining a rest position and a second position defining an energized position,
an intermediate layer sandwiched between said conductor means, and,
elastic connector means within said blanket for joining the first and second walls to said intermediate layer at spaced intervals whereby said conductor means are separable in accordance with a predetermined pattern under control of said connector means in response to repelling forces created by a magnetic field developed when said electrical conductor means are energized by an electric current.

2. The device of claim 1 wherein the first and second walls, the intermediate layer and the connector means are fabricated of a thermoplastic polymer.

3. The device of claim 1 wherein a first connector means joins the first outer wall to the intermediate layer and a second connector means joins the second outer wall to the intermediate layer, the joints to the intermediate layer being on opposite sides of the intermediate layer.

4. The device of claim 3 wherein the blanket is elongated and the first and second outer walls are joined to the intermediate layer by a plurality of spaced first and second connector means, respectively, said first and second connector means projecting from opposite sides of said intermediate layer.

5. The device of claim 4 wherein the joints between the first outer wall and the intermediate layer are offset longitudinally relative to the joints between the second outer wall and the intermediate layer.

6. The device of claim 1 wherein an insulator means is disposed between each said conductor means and said intermediate layer.

7. The device of claim 6 wherein the insulator means is a thermal and an electrical insulator fabricated of a thermoplastic polymer having a melting point greater than the melting point of the thermoplastic polymer from which the blanket, the connector means and the intermediate layer are fabricated.

8. The device of claim 6 wherein the elastic connector means project through said insulator means.

9. The device of claim 1 wherein each conductor means defines at least one generally flat, continuous ribbon patterned to define elongated ribbon portions spaced by intervening elongated gaps.

10. The device of claim 9 wherein said connector means are spaced along said ribbon portions and disposed in said intervening gaps.

11. The device of claim 1 wherein the connector means have an elastic memory thereby providing a restoring force tending to return said conductor means to the rest position when de-energized.

12. The device of claim 11 wherein the blanket is formed with a peripheral seal so that when the conductor means move from the rest position to the energized position a plurality of voids are developed between one of said first and second outer walls and said intermediate layer whereby said voids create a vacuum, said vacuum enhancing the restoring force of said connector means.

* * * * *